United States Patent Office 2,776,365
Patented Jan. 1, 1957

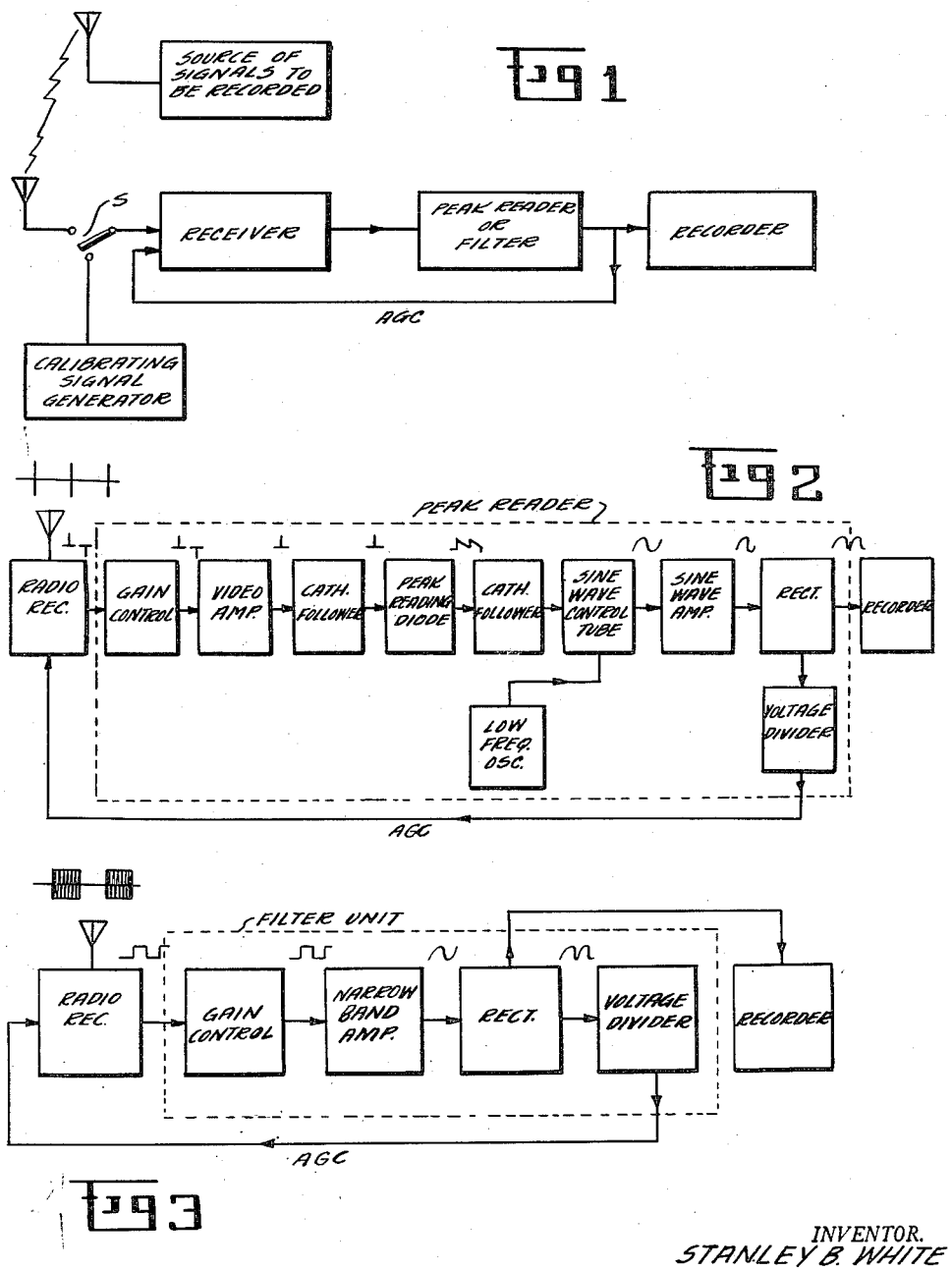

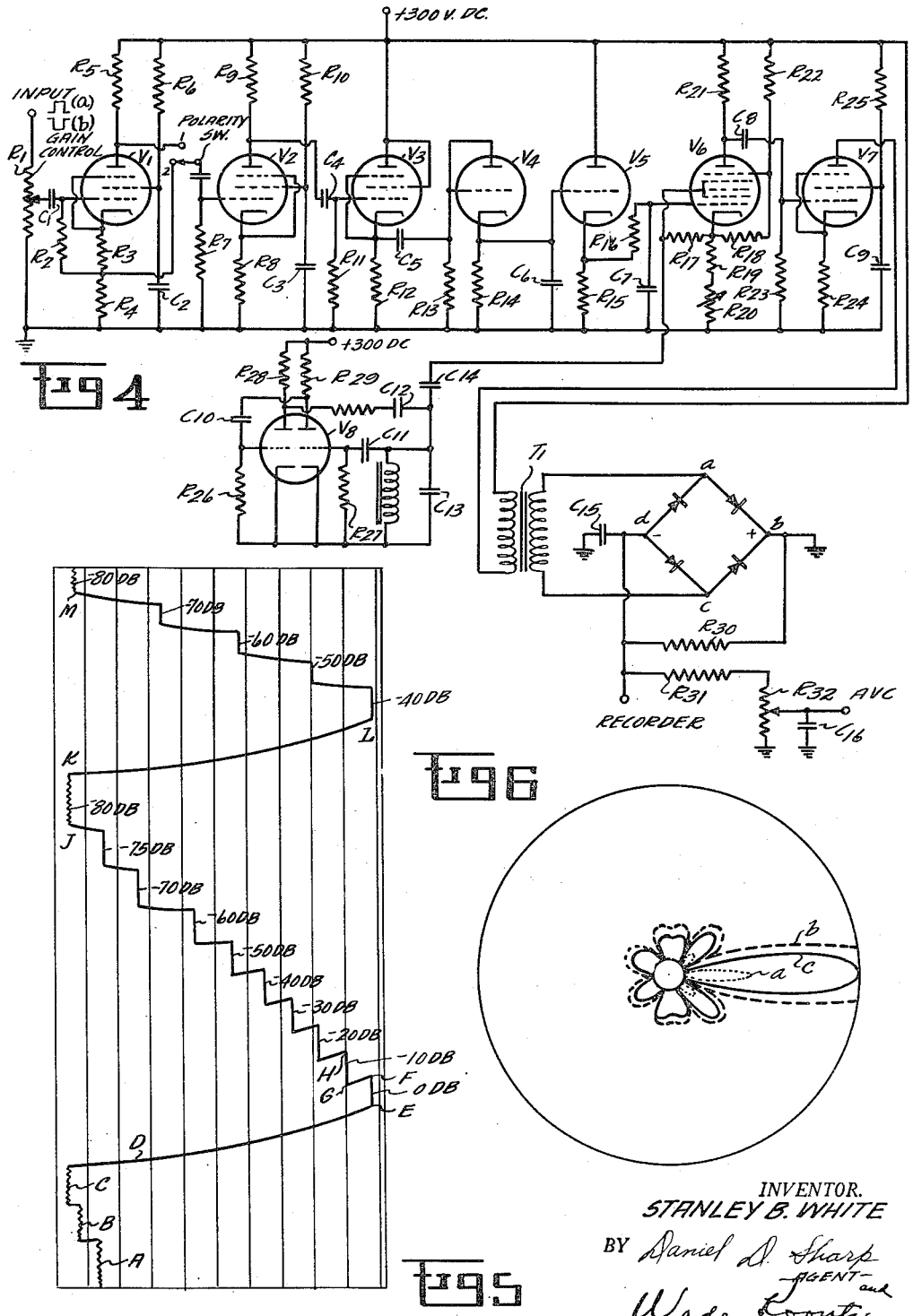

2,776,365

PROPAGATION RECORDING SYSTEM

Stanley B. White, Dayton, Ohio

Application August 28, 1951, Serial No. 244,083

4 Claims. (Cl. 250—2)

(Granted under Title 35, U. S. Code (1952), sec. 266)

The invention described herein may be manufactured and used by or for the Government for governmental purposes without payment to me of any royalty thereon.

This invention relates to a propagation recording system used to measure and record variations of electromagnetic field strength with distance or attitude.

In the design and operation of any electronic radio wave propagation equipment in which either the transmitter or receiver or both are airborne, a knowledge of the variations of field strength with distance and the reasons for such variations is highly desirable.

In one application of this invention air-to-air tropospheric radio propagation measurements are made by taking a series of readings of signal level as a function of statute miles between a transmitter and a receiver mounted in separate aircraft and opening range on reciprocal headings.

In another application of this invention the radiation pattern of an antenna under test is recorded. In this case, the energizing transmitter, as well as the receiving and recording equipment, are located at a ground installation. The test antenna is rotated at the same speed as a recorder chart and the strength of the signals received at the test antenna under test at the various angular positions of the said antenna is recorded as a continuous pattern on a polar recorder chart.

When recording the strength of signals having a voltage range of the order of over a million to one it becomes necessary, in order to obtain an approximate linear calibration over a wide range of voltages, to use a recording voltmeter which gives a recording proportional to, or nearly to, the logarithm of the input voltage.

By reducing the sensitivity of the recorder system at higher input signals and by the use of variable-mu tubes which have a logarithmic characteristic, the necessary compression of the signals is obtained, thereby providing approximately the same degree of accuracy over the entire chart.

The object of this invention is to provide means for recording extremely wide variations of signal strength so that the entire range of signals may be clearly and accurately presented on a recorder chart without crowding of any portion of the range of signals recorded.

Figure 1 is a block diagram of the basic propagation recording system;

Figure 2 is a block diagram of a propagation recording system for use with short pulse equipment;

Figure 3 is a block diagram of a propagation recording system for use with long pulse (square wave) equipment;

Figure 4 is a schematic diagram of a peak reader used in connection with short pulse equipment;

Figure 5 represents a chart used in connection with radio propagation measurements;

Figure 6 represents a polar chart used in connection with antenna pattern measurements.

The basic recording system, shown in Figure 1, may be used for either air-to-air tropospheric propagation investigation or for recording antenna patterns.

Referring to Figure 1, the receiving equipment comprises a receiving antenna and a receiver installed on the receiving aircraft. A calibrating signal generator which has been carefully calibrated in advance in the laboratory and whose internal modulation conforms with the signal modulation characteristics of the propagation transmitters is also installed in the receiving aircraft. Depending upon the position of a two-position switch S, either the signals radiated into space by the associated transmitter in the transmitting aircraft and picked up by the receiving antenna or the calibrating signals from the signal generator are applied to the receiver input. The output of the receiver is fed either to a peak reading voltmeter-amplifier, otherwise termed a peak reader, or a filter-rectifier-amplifier, otherwise referred to as a filter unit, depending on the type of radio frequency propagation link employed. The output of the peak reader or filter unit is applied to a recorder such as a Model AW Esterline-Angus, 0 to 1 ma., ink recording milliammeter, using a spring-driven chart speed of 3 inches per minute. The time constant of this recorder is approximately one-half second which limits its frequency response to less than 2 C. P. S. Other types of recording instruments may, of course, be used.

An AGC voltage is fed back from the output of the peak reader or filter unit, as the case may be, to the I. F. stages of the receiver. The AGC feedback action of each of the receivers used is adjusted in such a way that the entire dynamic range of the receiver is represented in a fairly linear range of db in the recorder chart.

The equipment is calibrated by the signal generator before and after each flight. A record of a typical calibration is shown in Figure 5. The type of receiver used in a particular propagation test run depends on the R. F. propagation link being operated.

Pulse and square wave tropospheric propagation links may be operated during any series of flights.

In the case of the square wave equipment, the receiver output is fed to a specially designed filter-rectifier-amplifier, described further in connection with the explanation of the circuit of Figure 3.

In the case of the short pulse links, the receiver output is fed to a peak reading voltmeter-amplifier, described infra, which, in turn, furnishes an AGC voltage to the receiver I. F. strip, as well as energizing the recorder movement. This short pulse equipment, shown in Figure 2, operates by means of the varying D. C. voltage coming from the peak reading diode circuit. The amplitude of the D. C. output voltage varies as the signal input to the receiver. The R. F. section of the receiver, the gain control, the AGC circuit and the recorder circuit are the same for both short and long pulse circuits.

The system shown in Figure 3 is the long pulse equipment for reception of square waves. The long pulse equipment consists of a broadband radio receiver which, because of the bandwidth, and consequent minimized effect of drifts in the receiver local oscillator and transmitter, is inherently stable mechanically and electrically. The receiver output is applied to a filter unit including a video gain control potentiometer for adjusting the amplitude of the noise in the receiver with no signal present and a narrow band audio frequency amplifier which acts as a filter. The filter section has a pass band of 12 C. P. S. between points of half power centered at 1818 cycles per second. The resulting sinusoidal output of the tuned A. F. amplifier is then rectified by a selenium rectifier. Any ripple appearing in the output of the rectifier may be filtered out in whole or part. From the rectifier following the narrow band amplifier a certain percentage of the negative output voltage, determined by the setting of the voltage divider, is fed back to the I. F.

amplifier in the receiver so that the entire range of signal can be compressed on the recorder chart. The gain control potentiometer may be placed in the I. F. stages of the receiver, as well as in the video stage. Since the gain control is shown in the drawings to be in the video stage of the receiver, it is here referred to as a video gain control.

The recorder chart is calibrated from left to right with minimum signal being shown on the left-hand edge of the chart and maximum signal being shown at the right-hand edge of the chart.

The video gain control is adjusted so that, with no signal, a small amount of noise is shown at the left-hand edge of the recorder chart of the maximum receiver sensitivity.

The voltage divider or automatic gain control is then adjusted so that the maximum signal strength expected is shown at the right-hand edge of the chart.

The use of the filter unit with the tuned amplifier or filter, although restricting the bandwidth and frequency response, results in an increased receiver-recorder sensitivity or loop gain of approximately 25 db.

Figure 5 represents a replica of an Esterline-Angus Recorder Chart which is used in recording the strength of the incoming signals to the receiver. To calibrate the recorder chart, the output of a standard signal generator calibrated either in db below 1 milliwatt or in db below one tenth of a volt in a 50 ohm line, is fed into the receiver antenna. In making propagation measurements, it is desired to record a range of from 0 db to a point at which the received signal is lost in noise. With no signal present in the receiver, a certain amount of noise will be present, and the video gain control is adjusted so that a small amount of noise appears on the chart, as shown at A. By adjusting the video gain control so as to reduce the gain, the needle will take up the position shown at B. In order to get the desired range of signal strengths to cover the entire width of the chart, the gain of the video gain control is further reduced until the needle takes up the position C just at the left edge of the chart.

Next, the signal generator output is set to 0 db. The voltage divider is then adjusted so that the needle strikes the right-hand edge of the chart E. The movement of the needle during this step is shown at D.

Having set the video gain control and the voltage divider or AGC control so that between the lower and upper limits of power to be measured the movement of the needle covers the entire width of the chart, the chart calibration may be commenced at point E. The signal generator is set at —10 db and the recorder needle traces a curved path FGH. The straight portion of the path GH corresponds to a power level of —10 db. The signal generator is next set at —20 db and a vertical path marked by the needle and corresponding to a power level of —20 db is obtained. This calibration procedure is repeated for any desired number of steps, as shown in the region between E and K. The power level shown by irregular line JK corresponds to the power level shown at C. This level at which the signal is lost in noise is approximately —80 db in the case of the peak reader and —105 db when the filter unit is used.

If it is desired to show that portion of the power level range between —40 db and —80 db (the noise level in this case when using a peak reader) then the voltage divider setting is changed so that the recorder needle moves just to the right-hand edge of the chart with the signal generator set at —40 db. The right-hand edge of the chart thus corresponds to a power level of —40 db. The movement of the needle during this step is shown at KL.

The time intervals between settings of the signal generator are shown approximately equal in Figure 5 for the sake of simplicity, although they obviously are subject to the will of the operator making the calibration.

The calibration from L to M is accomplished in the same manner as that from E to J.

The video gain control may be adjusted so that the needle of the recorder takes up the position at the left-hand edge of the chart corresponding to any desired minimum signal strength. In other words, if the range of signal levels desired to be investigated is from —40 db to —60 db, the video gain control is adjusted so that the recorder needle rests on the left-hand edge of the chart when the calibrating signal generator is set at —60 db. The maximum range of the chart as used in radio propagation measurements, is from the noise level of the receiver to one-tenth of a volt, the latter being the maximum output of the calibrating signal generator.

The pulse peak recorder described in Figure 4 is designed to avoid drift inherent in a system employing direct current amplifiers. It has been found in practice that unless extreme care beyond the limits of practicability is taken in the design of D. C. amplifiers they are inherently unstable and cause the needle of the recorder to drift considerably. To avoid the use of a direct current amplifier, which may cause undesired drift, between the output of diode V4 and the output circuits, the output of an oscillator V8 may be fed to either of the control grids of the mixer or control tube V6. The output of the isolation stage V5, which is proportional to the output of the detector diode V4, is fed to the other of said control grids of control tube V6. In this way, an A. C. output is obtained in the plate circuit of the control tube which is proportional to the direct current output of the diode V4.

Figure 4 describes a pulse peak reader in accordance with applicant's invention. The short pulses arriving at the input terminal from the radio receiver are applied to the control grid of amplifier tube V1 by way of video gain control R1. A polarity switch is provided in the circuitry of tube V1 so as to provide always a negative pulse on the grid of the succeeding amplifier tube V2. If positive pulses are being received, as shown at (a), the contact of the polarity switch is turned to the Number 1 position. If negative pulses arrive the Number 2 position of the polarity switch is used. The amplifier stages V1 and V2 are conventional and need not be described in detail. The negative pulses appearing on the grid of tube V2 are amplified and fed to cathode follower tube V3. The output of the cathode follower is applied to peak reading diode V4 which is here shown as a 6SN7 triode with grid and anode tied together. A diode valve may also be used. Upon application of the positive "spike" on the plate of diode V4, condenser C6 changes rapidly. The charging circuit for the diode V4 includes R12, C5, the space current path of valve V4, capacitor C6 and the ground return path. The time constant of this changing path is quite short, being approximately 0.4 microsec. owing to the small values of the cathode follower output impedance (about 300 ohms) and capacitor C6 (1200 micromicrofarads). This charge on C6 leaks off slowly, since resistor R14 is large (about 30 megohms). Capacitor C6 discharges through the path C6, R14 and ground.

The time constant of the discharge circuit is governed by the type recorder used and the type of data to be collected. If the time constant is too long, the voltage applied to the grid of cathode follower V5 holds up and the device is insensitive to changes in signal. The decay time must be fast enough to follow the data recorded. On the other hand, if the discharge circuit time constant (decay time) is too short, the energy received is considerably reduced.

The charging time constant must be such that the amplitude of the detected signal is unaffected by changes in pulse width. The output of peak reading diode V4 is fed to grid of a cathode follower tube V5, which acts as an isolator stage so that the peak detector time constant is not effected by grid current in tube V6. The high value of cathode resistor R15 produces a high input impedance in cathode follower stage V5 for purposes of isolation.

An oscillator or chopper V8 provides source of energy of frequency equal to about 5000 C. P. S. which is fed to one of the control grids of control tube V6. The output of cathode follower V5 is fed to the other of said control grids of control tube V6 through an integrating circuit comprising resistor R16 and capacitor C7. This integrating circuit serves to shunt out the high frequency components that make up the steep wave front and which otherwise would shock excite the front end of the receiver into undesired low frequency oscillations or "motorboating" upon being fed back through the AGC circuit. The shunting effect must be limited, of course, so that the fluctuation frequency of the input signal is not removed, thereby preventing the recorder from responding to these variations.

The voltages from the oscillator V8 and the cathode follower V5 need not be applied to different grids of control tube V6, but both may be applied to the same grid. Moreover, one voltage may be applied to a grid of control tube V6 and the other voltage inverted and applied to the cathode of V6.

The rectified "peak" from diode V4 regulates the transconductance of control tube V6, thereby controlling the A. C. output from V6.

The pulse repetition frequency should be approximately from 10 to 20 times the rate of variation in signal strength. The oscillator frequency should be such that its fundamental frequency and the harmonics thereof differ from the pulse repetition frequency by more than the frequency of response of the recorder being used.

The output of the control tube V6 is applied via a coupling capacitor C8 to the control grid of amplifier V7. The output of V7 which is approximately sinusoidal is supplied to the primary of transformer T1, the secondary of which is connected across two opposite terminals $a$ and $c$ of a rectifier. The negative terminal $d$ is connected directly to a recorder and through a capacitor C15 to ground. Positive terminal $b$ is connected to ground. A resistor A30 is connected across the opposite terminals $b$ and $d$.

An "AVC" potentiometer R32 is connected in series with resistor R31 across terminals $d$ and $b$ as shown.

The filaments of the various tubes are supplied from a conventional 115$^v$–6$^v$ filament transformer.

The subject invention may also be used in recording antenna patterns. As shown in Figure 1, the source of signals may be a transmitting antenna energized, for example, by a calibrated pulse signal generator. Signals from the transmitting antenna are picked up by the receiving antenna under test and passes through the same basic system as that previously described in connection with radio propagation measurements. See Figure 1. The peak reader, shown in detail in Figures 2 and 4, is used when the signals being radiated from the transmitting antenna are short pulses, while the filter unit, shown in Figure 3, is used when the radiated signals are long pulses (square waves).

A recorder having a polar chart is used. The rotation of the antenna under test and the recorder chart should be synchroninzed or made equal so that the angular position of the recorder chart corresponds to the angular position of the test antenna. The transmitting antenna is, of course, maintained in a fixed position during a given antenna measurement.

The output of the transmitting signal generator is adjusted together with the gain control on the receiver until the smallest lobes of the antenna pattern are large enough on the chart to be intelligible. When the detail of the minor lobes is thus increased sufficiently to afford accurate readings, the voltage divider potentiometer is adjusted until the extremity of the main lobe or lobes appear just at the outer edge or periphery of the polar chart. It may be necessary to readjust the various controls so that both extremities of the antenna pattern are intelligible and the maximum width of the chart is utilized. For example, if the main lobe is so large that only a part appears on the chart, either the output of the calibrating signal generator at the transmitter or the voltage divider potentiometer output, or both, are adjusted until the main lobe extremity falls just within the outer edge of the chart.

Referring to Figure 6, various antenna patterns are shown on a recorder polar chart corresponding to different settings of the controls.

Pattern $a$ represents the pattern derived when the gain control is set too low. Of course, the same pattern would result if the transmitter signal level (output of calibration signal generator of Figure 1) were set too low. For purposes of discussion, however, it will be assumed that the transmitter signal level is set at maximum. The minor lobes are so small that they are either lost in the center hole of the chart or are so small that the true shape of the lobes and signal level of the minor lobes at various angular positions along the lobes is unintelligible.

Pattern $b$ represents the pattern derived when the gain control is set too high and there is insufficient AGC voltage. Although the minor lobes are now intelligible the peak of the main lobe is lost.

Pattern $c$ is the desired pattern in which the requirements of intelligibility of minor lobes and of use of maximum width of the chart for the presentation of the complete major lobes are both met. Pattern $c$ is derived from pattern $b$ by adjustment of the voltage divider potentiometer.

What I claim is:

1. An electromagnet propagation recording system for recording the strength of received signals comprising a means for receiving said signals, a filter unit including a gain control potentiometer connected to said receiving means for adjusting the gain of said means for receiving, a tuned narrow band audio frequency amplifier acting as a filter and having a sinusoidal output, electrical connections from said tuned amplifier to said gain control potentiometer, means for rectifying the sinusoidal output of said tuned amplifier, and a voltage divider connected to said rectifier, electrical feedback connections from said voltage divider to said receiving means for controlling the amplification of said receiving means, and a recorder having a chart and connected to tthe output of said rectifier, said gain control potentiometer being adjusted so that the minimum signal to be measured appears at one edge of said recorder chart, and said voltage divider being adjusted so that the maximum range of signals can be shown on said recorder chart.

2. Apparatus for recording the strength of received radio waves amplitude modulated in accordance with a modulating wave of constant amplitude and frequency, said apparatus comprising: a radio receiver for receiving and demodulating said radio waves, the output of said receiver being the modulating wave; means for adjusting the amplitude of said modulating wave after it leaves said receiver; means for converting said adjusted modulating wave into a sinusoidal wave of proportionate amplitude; means for amplifying said sinusoidal wave; means for producing a direct voltage proportional to the amplitude of said sinusoidal wave; a direct current operated recorder; means for applying said direct voltage to said recorder; and means for applying an adjustable portion of said direct voltage to said receiver as an automatic gain control voltage to control the gain of said receiver in inverse relation to the amplitude of said direct voltage.

3. Apparatus for recording the strength of radio waves received in the form of sharp discrete pulses of radio frequency energy, the pulses being of uniform amplitude and constant repetition rate, said apparatus comprising: a radio receiver for receiving and detecting said radio frequency energy, the output of said receiver being a series of sharp voltage pulses corresponding to the received pulses of radio frequency energy; means for adjusting the amplitude of said voltage pulses after leaving said receiver; a peak reading rectifier circuit for producing from said adjusted voltage pulses a direct voltage proportional to the peak amplitude of said adjusted pulses; means for producing a sinusoidal wave having an amplitude proportional to said direct voltage; means for amplifying said sinusoidal wave; means for producing an output direct voltage proportional to the amplitude of said sinusoidal wave; a direct current operated recorder; means for applying said output direct voltage to said recorder; and means for applying an adjustable portion of said output direct voltage to said receiver as an automatic gain control voltage to control the gain of said receiver in inverse relation to the amplitude of said output direct voltage.

4. Apparatus for recording the strength of received radio waves amplitude modulated by a square wave of constant amplitude and frequency, said apparatus comprising: a radio receiver for receiving and demodulating said radio waves, the output of said receiver being said square wave; means for adjusting the amplitude of said square wave after it leaves the receiver; a narrow band amplifier capable of passing no component of said square wave other than its fundamental; means for applying said adjusted square wave to the input of said amplifier; means for producing a direct voltage proportional to the amplitude of the fundamental wave output of said amplifier; a direct current operated recorder; means for applying said direct voltage to said recorder; and means for applying an adjustable portion of said direct voltage to said receiver as an automatic gain control voltage to control the gain of said receiver in inverse relation to the amplitude of said direct voltage.

References Cited in the file of this patent

UNITED STATES PATENTS

| | | |
|---|---|---|
| 2,363,473 | Ryder | Nov. 21, 1944 |
| 2,385,212 | Konrad | Sept. 18, 1945 |
| 2,390,322 | Barr | Dec. 4, 1945 |
| 2,524,165 | Freedman | Oct. 3, 1950 |
| 2,579,464 | Bergeman | Dec. 25, 1951 |
| 2,602,884 | Schmitt | July 8, 1952 |

OTHER REFERENCES

Automatic Antenna Pattern Recorder, Radio and Television News (Engineering Sec.), vol. 43, No. 6, June 1950, pp. 10, 11, 12, 28.